United States Patent
Amanuma et al.

(10) Patent No.: US 7,328,096 B2
(45) Date of Patent: Feb. 5, 2008

(54) DRIVING FORCE SWITCHING CONTROL APPARATUS

(75) Inventors: Hirokatsu Amanuma, Utsunomiya (JP); Shuji Oshida, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 11/043,992

(22) Filed: Jan. 28, 2005

(65) Prior Publication Data

US 2005/0173179 A1   Aug. 11, 2005

(30) Foreign Application Priority Data

Feb. 10, 2004 (JP) ............... 2004-033973

(51) Int. Cl.
*B60K 6/04* (2006.01)
*G06F 7/00* (2006.01)
(52) U.S. Cl. .............. 701/69; 701/80; 701/81; 903/916; 903/942; 903/943
(58) Field of Classification Search .............. 701/1, 701/22, 29, 36, 51, 53, 58, 65, 69, 70, 71, 701/74, 80, 81, 82, 89, 99; 903/902, 903, 903/907, 916, 922, 927, 942, 943; 180/65.2; 340/428, 455, 636.1, 636.19
See application file for complete search history.

(56) References Cited

U.S. PATENT DOCUMENTS 5,453,930 A * 9/1995 Imaseki et al. .......... 701/22
5,778,997 A * 7/1998 Setaka et al. ......... 180/65.2
5,988,307 A * 11/1999 Yamada et al. ........ 180/243
6,205,379 B1 * 3/2001 Morisawa et al. ........ 701/22

FOREIGN PATENT DOCUMENTS

| JP | 07-231506 | 8/1995 |
|---|---|---|
| JP | 2003-312295 | 11/2003 |

* cited by examiner

*Primary Examiner*—Jack Keith
*Assistant Examiner*—Edward Pipala
(74) *Attorney, Agent, or Firm*—Arent Fox LLP

(57) ABSTRACT

A driving force switching control apparatus in a vehicle which runs by two-wheel drive or four-wheel drive in accordance with the running state. The apparatus includes a device for determining whether the vehicle runs at a constant speed; and a device for determining a drive system of the vehicle running at a constant speed to be the two-wheel drive or the four-wheel drive according to road surface conditions computed using rolling resistance. A threshold value for switching between the two-wheel drive and the four-wheel drive is changed in a manner such that a determination area where the four-wheel drive is selected increases according to increase in the rolling resistance. Sufficient driving force transmitted to the wheels can be secured even when the road surface condition varies, and accordingly, sufficient driving force is secured also when the running condition is changed from constant speed running to acceleration or deceleration running.

6 Claims, 7 Drawing Sheets

DRIVING FORCE SWITCHING CONTROL APPARATUS

BACKGROUND OF THE INVENTION

1. Field of the Invention

The present invention relates to a driving force switching control apparatus applied to a four-wheel drive vehicle which has at least one power source and performs two-wheel or four-wheel drive running according to the running state of the vehicle.

Priority is claimed on Japanese Patent Application No. 2004-033973, filed Feb. 10, 2004, the content of which is incorporated herein by reference.

2. Description of the Related Art

Recently, in order to improve fuel efficiency, four-wheel drive vehicles having at least one power source and performing two-wheel or four-wheel drive running according to the running state of the vehicle have been developed. As a relevant technique, Japanese Unexamined Patent Application, First Publication No. Hei 07-231506 discloses a hybrid vehicle having an engine and a motor as driving sources, and a charging device for charging a power source for the motor by using rotation of the engine, in which when measured remaining charge of the power source is equal to or less than a specific value and the engine is in a low load state, the load on the engine is increased to a maximum efficiency range so as to improve the charge efficiency in charging using the charging device. As another relevant technique, Japanese Unexamined Patent Application, First Publication No 2003-312295 discloses determining whether a vehicle runs at a constant speed (i.e., performs cruise running). If it is determined that the vehicle performs cruise running, the drive system is switched to two-wheel drive running.

However, even in the cruise running, two-wheel drive may not give adequate driving force depending on road surface conditions. If switching to two-wheel drive is executed even in such a case, a slip may occur on acceleration or deceleration of the vehicle, thereby degrading running performance (i.e., driveability).

SUMMARY OF THE INVENTION

In consideration of the above circumstances, an object of the present invention is to provide a driving force switching control apparatus for improving running performance or driveability while maintaining low fuel consumption.

Therefore, the present invention provides a driving force switching control apparatus provided in a four-wheel drive vehicle which has at least one power source and which runs-by two-wheel drive or four-wheel drive in accordance with a running state of the vehicle, the apparatus comprising:

a constant speed running determining device for determining whether the vehicle runs at a constant speed;

a road surface condition computing device for computing a road surface condition by using rolling resistance when the vehicle runs; and a drive system determining device for determining a drive system of the vehicle when it is determined by the constant speed running determining device that the vehicle runs at a constant speed, wherein the drive system is determined to be one of the two-wheel drive and the four-wheel drive in accordance with a computed result of the road surface condition computing device, wherein:

the drive system determining device changes a threshold value for switching between the two-wheel drive and the four-wheel drive in a manner such that a determination area where the four-wheel drive is selected increases according to increase in the rolling resistance.

According to the above structure, the rolling resistance is measured and the threshold value for switching between the two-wheel drive and the four-wheel drive is changed in a manner such that a determination area where the four-wheel drive is selected increases according to increase in the measured rolling resistance. Therefore, sufficient driving force transmitted to the wheels can be secured even when the road surface condition varies. Accordingly, sufficient driving force is secured also when the running condition is changed from constant speed running to acceleration or deceleration running. Thus, even when the road surface condition changes, acceleration or deceleration can be smoothly performed, thereby securing sufficient driving force and improving driveability. On the other hand, the two-wheel drive is selected when necessary driving force can be secured by the two-wheel drive, so that fuel consummation can be low.

Typically, the four-wheel drive vehicle is a hybrid vehicle in which either one of front wheels and rear wheels is driven by an internal-combustion engine (e.g., an engine 31 in an embodiment explained below) and the other one is driven by a motor (e.g., a rear motor 63 in the embodiment). In this case, when acceleration is performed in the four-wheel drive, superior response, which is a characteristic of motors, is effectively used for driving, and additionally, it is possible to smoothly perform switching between the two-wheel drive and the four-wheel drive by controlling the distribution for the output with respect to the internal-combustion engine and the motor.

Regarding the above structure, it is possible that:

the vehicle comprises a first motor (e.g., a rear motor 63 in the embodiment) which is the motor which drives the other one of the front wheels and the rear wheels, a second motor (e.g., a front motor 32 in the embodiment) for generating specific power by a driving output of the internal-combustion engine, a battery device charged by electric power generation by the second motor, and an inverter (e.g., a PDU 62 in the embodiment) provided between the second motor and the battery device;

the drive system determining device includes a temperature evaluating device for evaluating, based on a temperature and a quantity of electric power generation of the second motor or the inverter, a temperature of the second motor or the inverter at the quantity of electric power generation after a predetermined time has elapsed; and the drive system determining device reduces the quantity of electric power generation if it is estimated according to the evaluation of the temperature evaluating device that the temperature of the second motor or the inverter reaches a predetermined value after the predetermined time has elapsed.

Accordingly, the temperature of the second motor or the inverter after the predetermined time has elapsed is evaluated based on the measured temperature and quantity of electric power generation of the second motor or the inverter, so as to control the generated power in a manner such that heat generation of the second motor or the inverter is previously reduced, thereby controlling the second motor or the inverter having a temperature below a specific value. Therefore, it is possible to use the second motor or the inverter while securing reliability, thereby securing stable electric power supply; thus, four-wheel drive running for long periods can be performed.

It is also possible that:

the vehicle comprises a first motor which is the motor which drives the other one of the front wheels and the rear wheels, a second motor for generating specific power by a driving output of the internal-combustion engine, and a battery device for storing electric power generated by the second motor, the drive system determining device includes a remaining charge measuring device for measuring a remaining charge of the battery device; and a driving output of the internal-combustion engine is computed based on a driving output of main driving wheels of the vehicle, a driving output of the second motor for generating a driving power of the first motor which drives trailing wheels of the vehicle, and the remaining charge of the battery device.

Accordingly, when the output of the internal-combustion engine is determined, the driving output of the main driving wheels, the driving output of the second motor for generating the driving power of the first motor which drives the trailing wheels, and the remaining charge of the battery device are considered, thereby efficiently driving the engine with high fuel efficiency.

Regarding the above structure, it is possible that:

a quantity of electric power generation of the battery device is determined in consideration of brake specific fuel consumption;

when the remaining charge of the battery device is equal to or less than a first predetermined value and a required charge power of the battery device is higher than the quantity of electric power generation in consideration of the brake specific fuel consumption, a required charge power generating output corresponding to the required charge power is added to the driving output of the internal-combustion engine; and when the remaining charge of the battery device is equal to or less than the first predetermined value and a required charge power of the battery device is equal to or less than the quantity of electric power generation in consideration of the brake specific fuel consumption, an output for generating a quantity of power corresponding to the quantity of electric power generation in consideration of the brake specific fuel consumption is added to the driving output of the internal-combustion engine.

Accordingly, necessary charged power can be secured when the remaining charge of the battery device is low and the battery device must be charged, while when the charge of the battery device remains to some extent, a quantity of electric power generation in consideration of the brake specific fuel consumption is determined so as to drive the engine with high fuel efficiency, thereby improving the driveability while reducing fuel consumption.

In this case, it is also possible that:

when the remaining charge of the battery device is equal to or greater than a second predetermined value which is greater than the first predetermined value and the quantity of electric power generation in consideration of the brake specific fuel consumption is higher than a maximum charge permitted power of the battery device, a generation output corresponding to the maximum charge permitted power of the battery device is added to the driving output of the internal-combustion engine; and when the remaining charge of the battery device is equal to or greater than the second predetermined value and the quantity of electric power generation in consideration of the brake specific fuel consumption is equal to or less than the maximum charge permitted power of the battery device, or when the remaining charge of the battery device is less than the second predetermined value, an output for generating the quantity of electric power generation in consideration of the brake specific fuel consumption is added to the driving output of the internal-combustion engine.

Accordingly, when the charge of the battery device remains to some extent and the quantity of electric power generation in consideration of the brake specific fuel consumption is higher than the maximum charge permitted power of the battery device, the quantity of the maximum charge permitted power of the battery device can be charged to the battery device so as to secure required charge power, and when the quantity of electric power generation in consideration of the brake specific fuel consumption is low, the quantity of electric power generation in consideration of the brake specific fuel consumption is employed. Therefore, the engine can be driven with high fuel efficiency. Thus, driveability can be improved while reducing fuel consumption.

DETAILED DESCRIPTION OF THE INVENTION

Hereinafter, a driving force switching control apparatus as an embodiment according to the present invention will be explained with reference to the drawings.

Figure 1:
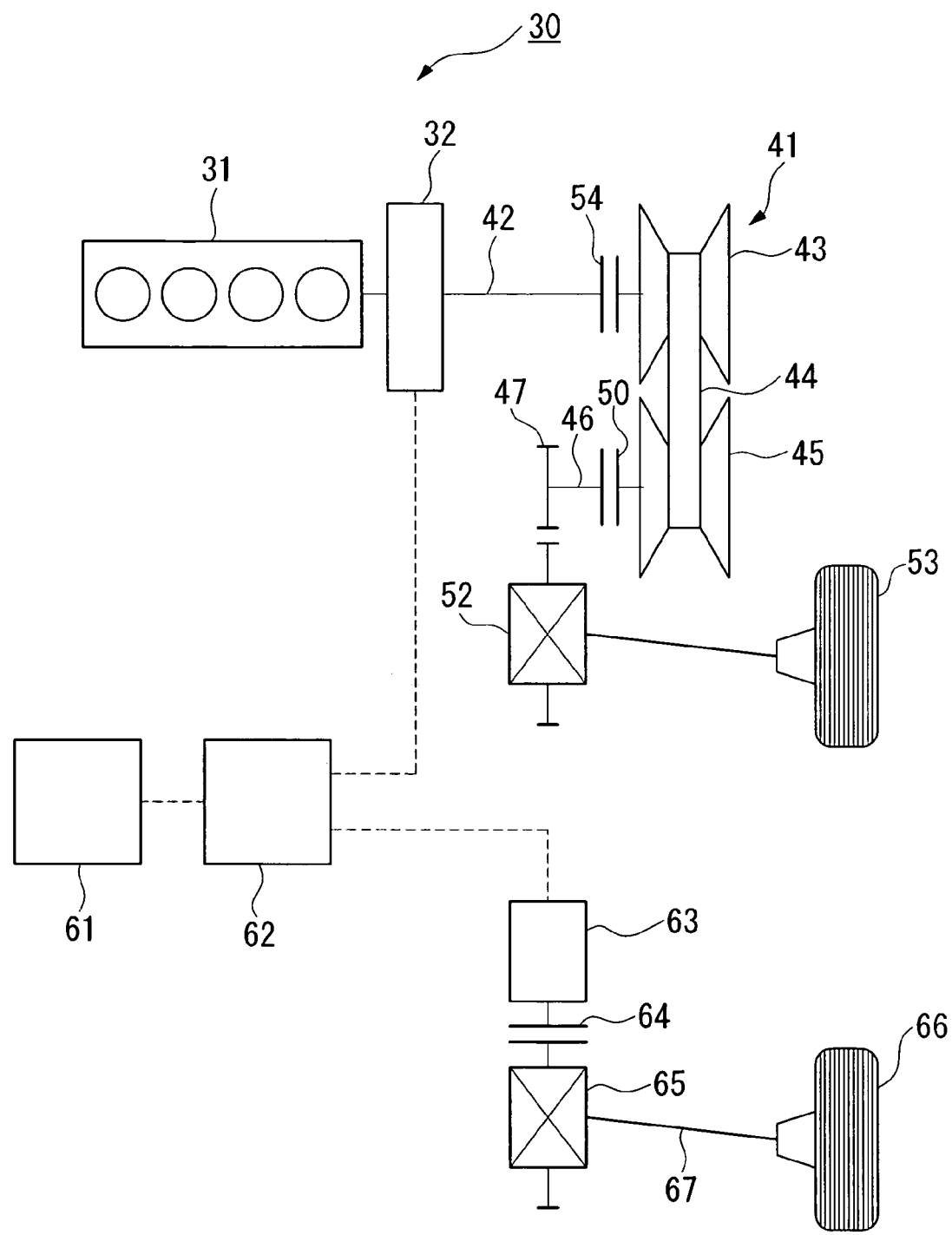
FIG. 1 is a diagram showing the general structure of a driving force switching control apparatus as an embodiment according to the present invention.

FIG. 1 is a diagram showing a driving force switching control apparatus 30 of the embodiment. The driving force switching control apparatus 30 has an (internal-combustion) engine 31, a front motor 32 (here, the second motor), and a rear motor 63 (here, the first motor) as driving sources.

In the present embodiment, the transmission 41 is a continuously variable transmission (CVT), and to the main shaft 42 of the transmission 41, a drive pulley 43 (DR pulley) is connected, and the drive pulley 43 is connected via a belt 44 to a driven pulley 45 (DN pulley). A driven shaft 46 is connected to the center axis of the driven pulley 45.

A first clutch 54 is provided between the drive pulley 43 and the motor 32. The rotation power of the engine 31 or the motor 32 is transmitted or disconnected by connecting or disconnecting the first clutch 54 between the drive pulley 43 and the motor 32.

An output gear 47 is provided at the driven shaft 46, and a second clutch 50 is provided between the output gear 47 and the driven pulley 45. The driving force transmitted to the driven shaft 46 is transmitted or disconnected to the output gear 47 by connecting or disconnecting the second clutch 50 between the output gear 47 and the driven pulley 45. A differential gear 52, connected to (front) wheels 53, is connected to the driven shaft 46. Accordingly, the driving force transmitted to the output gear 47 is transmitted via the differential gear 52 to the front wheels 53.

The power of the rear motor 63 is transmitted via a rear differential gear 65 to an output shaft 67, so as to drive rear wheels 66. That is, the hybrid vehicle of the present embodiment is a four-wheel drive vehicle in which the front wheels 53 can be driven by at least one of the engine 31 and the front motor 32, and the rear wheels 66 can be driven by the rear motor 63.

In deceleration of the hybrid vehicle, when driving force is transmitted from the front wheels 53 to the front motor 32, the front motor 32 functions as an electric motor and generates so-called regenerative braking force, so that kinetic energy of the vehicle body is stored as electrical energy. Similarly, in deceleration of the hybrid vehicle, when driving force is transmitted from the rear wheels 66 to the rear motor 63, the rear motor 63 functions as an electric motor and generates so-called regenerative braking force, so that kinetic energy of the vehicle body is stored as electrical energy. In the present embodiment, the front motor 32 mainly operates as a generator, while the rear motor 63 mainly operates as a drive motor.

The driving and regenerative operations of the front motor 32 and the rear motor 63 are performed by a power drive unit (PDU) 62 which receives control commands from an ECU (electrical control unit, not shown). The power drive unit 62 is a motor control unit whose main component is an inverter circuit. To the power drive unit 62, a Ni—H$_2$ battery 61 is connected, which is a high voltage battery for sending and receiving electrical energy to and from the front motor 32 and the rear motor 63. In addition, the battery 61 has serially-connected modules, each including serially-connected cells.

In the present embodiment, a third clutch 64 is provided between the rear motor 63 and the rear differential gear 65. The connection or disconnection between the rear motor 63 and the rear wheels 66 is performed by controlling the third clutch 64, so that energy can be transmitted or disconnected between the rear motor and the rear wheels 66.

Also in the present embodiment, a speed sensor for determining the speed of the vehicle, rotation speed sensors for measuring the rotation speed of the front wheels 53 and the rear wheels 66, sensors for measuring the remaining charge and the temperature of the battery 61, and the like, are provided (sensors are not shown in the drawings).

Figure 2:
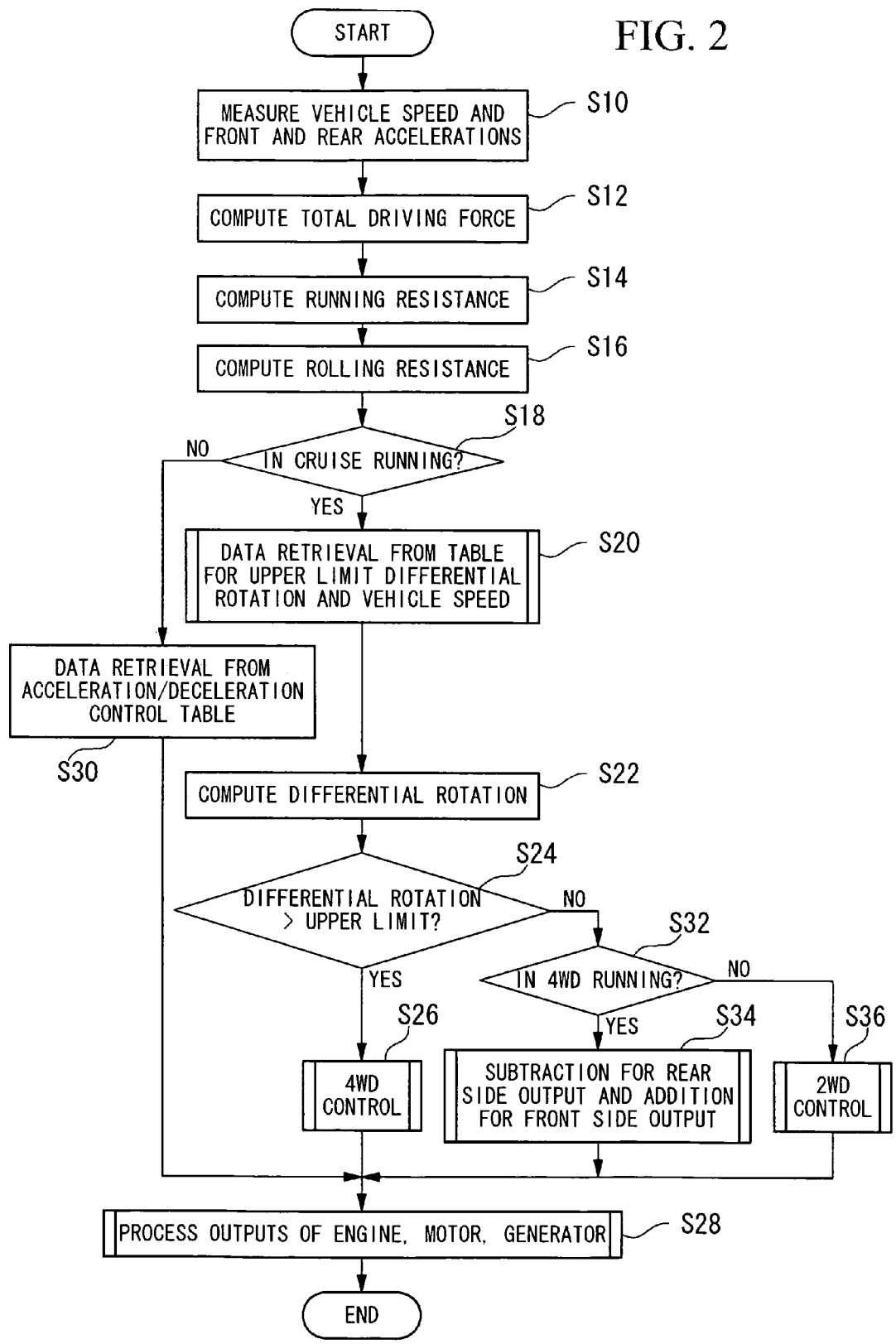
FIG. 2 is a flowchart showing the operation of the driving force switching control.

FIG. 2 is a flowchart showing the driving force switching control operation. First, in step S10, vehicle speed, and front and rear accelerations are measured using the speed sensor provided in the vehicle and acceleration sensors provided at the front and rear wheels (sensors not shown). In step S12, total driving force of the vehicle is computed based on the speed and accelerations of the vehicle. In step S14, running resistance is computed. The running resistance is basically computed by a value of running resistance which is predetermined with respect to the vehicle speed (i.e., a value decided in a table or a characteristic value).

In step S16, rolling resistance is computed, which can be computed using running resistance if the vehicle runs at a constant speed.

That is, running resistance can be computed by the following formula (1).

$$\text{running resistance } Fw = \text{rolling resistance } Fro + \text{air resistance } Fl + \text{grade resistance } Fst + \text{acceleration resistance} \quad (1)$$

When the vehicle is in the cruise running, the above grade resistance Fst and the acceleration resistance can be regarded as zero, and the air resistance Fl can be regarded as a fixed value; thus, the running resistance Fw is almost the same as rolling resistance Fro.

In step S18, it is determined whether the vehicle is in the cruise running by referring to a value measured by a G sensor (not shown) or the like. If the result of the determination is YES, the operation proceeds to step S20, if the result of the determination is NO, the operation proceeds to step S30.

Figure 7:
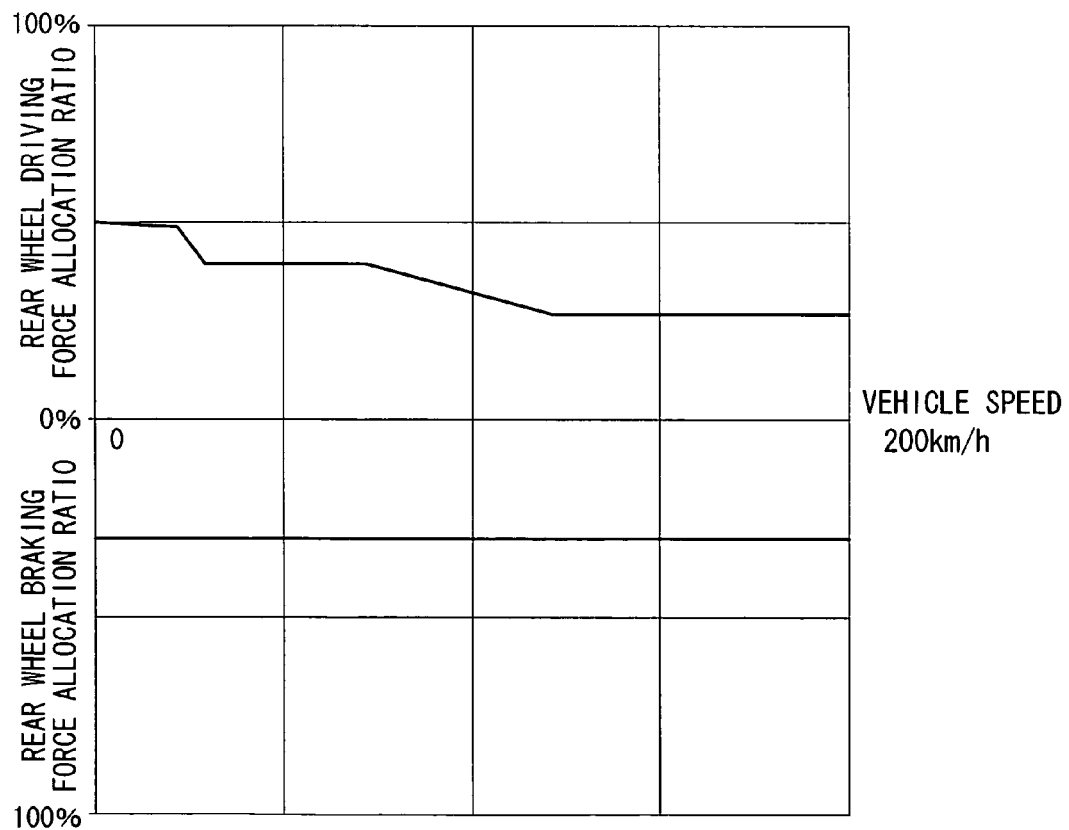
FIG. 7 is a map for four-wheel drive, determined in accordance with the vehicle speed and the rear wheel driving force allocation ratio.

In step S30, table data retrieval operation is performed with respect to an acceleration and deceleration control table. This operation will be explained by referring to FIG. 7 which is a map for four-wheel drive, determined in accordance with (i) vehicle speed and (ii) rear wheel driving force allocation ratio. The rear wheel braking force allocation ratio in the diagram is for a case in which the accelerator pedal is not depressed (i.e., off) and the brake pedal is also not depressed (i.e., off). The driving state of the vehicle is controlled based on the above map, and the operation proceeds to step S28 explained below.

Figure 6:
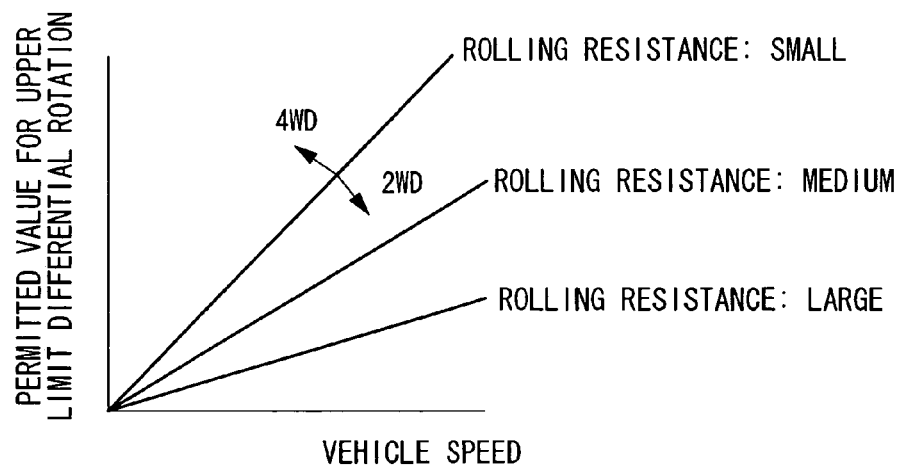
FIG. 6 is a graph relating to the relationships between the vehicle speed and permitted values for the upper limit differential rotation, and the graph shows threshold values for switching between the four-wheel drive and the two-wheel drive in accordance with the rolling resistance.

In step S20, a table for determining relationships between upper limit differential rotation (between the front wheels and the rear wheels) and vehicle speed is referred to. This process will be explained by referring to FIG. 6. FIG. 6 is a graph relating to the relationships between the vehicle speed and permitted values for the upper limit differential rotation, and the graph shows threshold values for switching between the four-wheel drive and the two-wheel drive in accordance with the rolling resistance. In the graph, the area above each threshold line is an area where four-wheel drive control is performed, while the area below each threshold line is an area where two-wheel drive control is performed. As will be understood from the graph, the threshold value is determined in a manner such that the area where the four-wheel drive control is performed increases according to increase in the rolling resistance.

In step S22, differential rotation (between the front wheels and the rear wheels) is computed, and in step S24, it is determined whether the computed differential rotation is greater than the upper limit differential rotation which is retrieved from the table. If the result of the determination is YES, the operation proceeds to step S26, while if the result of the determination is NO, the operation proceeds to step S32. In step S26, the control system is determined as being four-wheel drive. In step S28, the outputs of the engine 31 and the motors 32 and 63 are processed by a method suitable for the determined drive control (in the present case, four-wheel drive control), and the operation of the flowchart is terminated.

In step S32 which is performed if the result of the determination of step S24 is NO, it is determined whether the vehicle is running in four-wheel drive control. If the result of the determination is YES, the operation proceeds to step S34, while if the result of the determination is NO, the operation proceeds to step S36.

In step S34, the subtraction process for the output at the rear side and the addition process for the output at the front side are performed, so that the control gradually approaches the two-wheel drive control. In step S36, the control system is set to two-wheel drive control because two-wheel drive control can produce sufficient driving force. In either case as explained above, the operation proceeds to step S28, where the above-explained control is performed and the operation of this flowchart is terminated.

Figure 3:
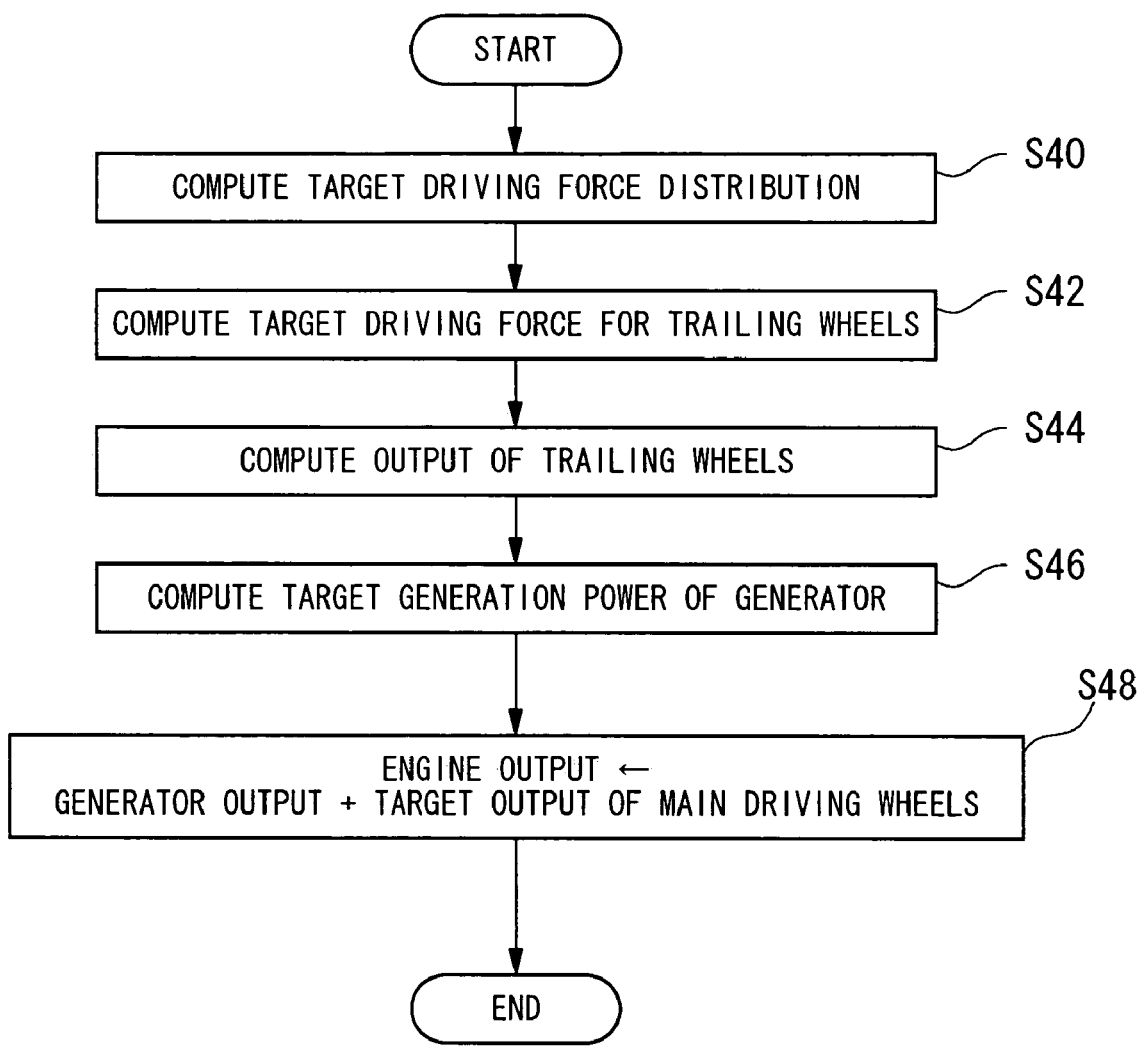
FIG. 3 is a flowchart showing the operation of computing the engine output based on the output of the generator.

FIG. 3 is a flowchart showing the operation for computing the engine output based on the output from the generator.

In this control, in the first step S40, target driving force distribution is computed, more specifically, the distribution ratio between the front wheel side and the rear wheel side is computed based on the entire target driving force. In step S42, target driving force for the trailing (or driven) wheels 66 (in this case, the rear wheels) is computed by dividing the entire driving force by the distribution ratio and then multiplying the quotient by a specific coefficient.

In step S44, the output of the trailing wheels 66 is computed by multiplying the driving force by the rotation speed, a specific coefficient, and the efficiency.

In step S46, the target generation power of the generator 32 (in the present case, the front motor) is computed. The target generation power is computed in consideration of the output of the trailing wheels 66, the output efficiency of the motor/generator 32, and energy management of the battery 61.

In the last step S48, the output of the generator 32 and the target output of the main driving wheels 53 are added so as to compute the output of the engine 31, and the operation of this flowchart is terminated.

Figure 4:
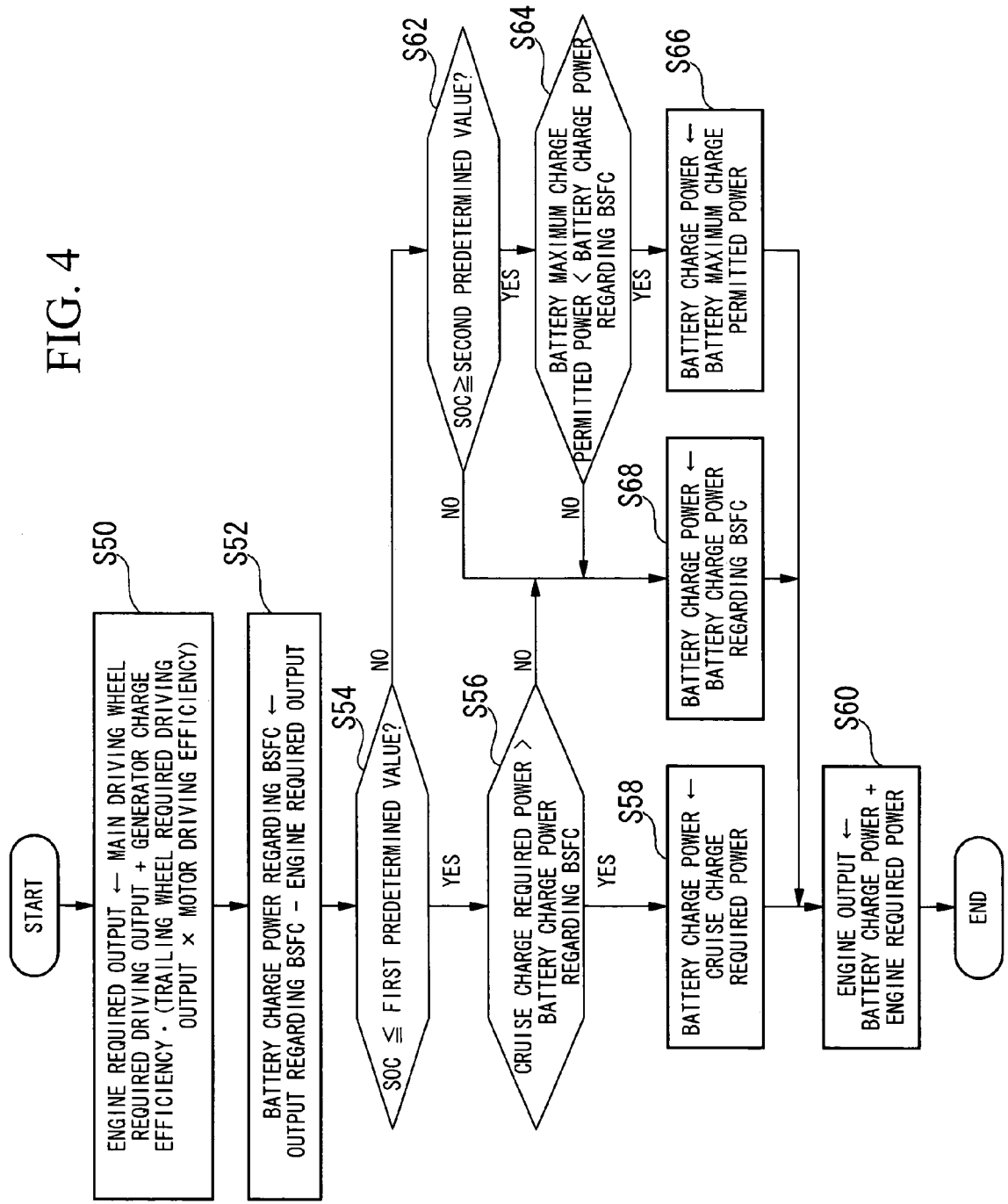
FIG. 4 is a flowchart showing the operation of computing the engine output based on the battery charge power.

FIG. 4 is a flowchart showing the operation of computing the engine output based on the battery charge power.

In the first step S50, required output for the engine 31 is computed by multiplying the required driving output of the trailing wheels 66 by the driving efficiency of the motor 63 and the charge efficiency of the generator 32, and then adding the product to the driving output required of the main driving wheels 53. This required output for the engine 31 is an output for directly driving the front wheels 53 and the motor 63.

In step S52, the required output for the engine is subtracted from the output regarding BSFC (brake specific fuel consumption), so as to compute battery charge power. Here, the output regarding the optimum rate of fuel consumption can be retrieved and determined by using the required driving force, the rotation speed, and the like.

In step S54, it is determined whether the remaining charge of the battery (i.e., the state of charge (SOC)) is equal to or less than the first predetermined value. If the result of the determination is YES, the operation proceeds to step S56, while if the result of the determination is NO, the operation proceeds to step S62. Preferably, the first predetermined value is set to a threshold value for securing the minimum charge.

In step S56, it is determined whether cruise charge required power, which is a power required in cruise running mode, is higher than the battery charge power determined in consideration of BSFC (i.e., battery charge power regarding BSFC). If the result of the determination is YES, the operation proceeds to step S58, while if the result of the determination is NO, the operation proceeds to step S68.

In step S58, the battery charge power is set to the cruise charge required power. Accordingly, charge power necessary for cruise driving can be stored in battery 61, thereby securing reliability.

In step S60, the set battery charge power and the engine required power are added so as to compute the engine output, and the operation of the series of steps is terminated.

In step S62, it is determined whether the remaining charge of the battery (i.e., SOC) is equal to or greater than the second predetermined value which is greater than the first predetermined value. If the result of the determination is YES, the operation proceeds to step S64, while if the result of the determination is NO, the operation proceeds to step S68. Preferably, the second predetermined value is a threshold value for determining whether the quantity of charge is to be limited.

In step S64, it is determined whether the battery maximum charge permitted power is less than the battery charge power regarding BSFC. If the result of the determination is YES, the operation proceeds to step S66, while if the result of the determination is NO, the operation proceeds to step S68. In step S68, the battery charge power is computed as the battery charge power regarding BSFC, and the operation proceeds to step S60.

In step S66, the battery charge power is set to the battery maximum charge permitted power, and the operation proceeds to step S60.

Figure 5:
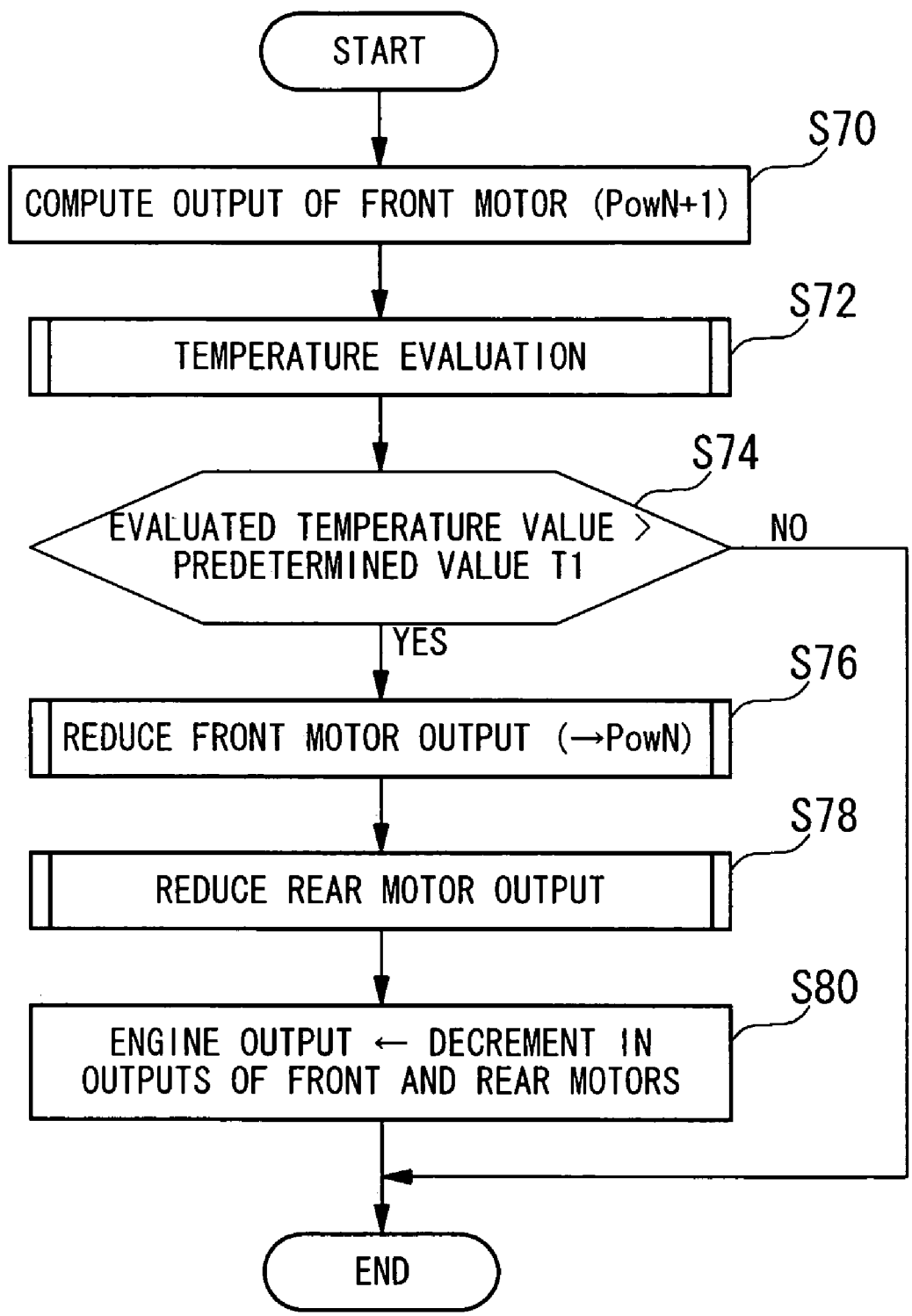
FIG. 5 is a flowchart showing the operation of computing the engine output based on the evaluated temperature of the front motor or the inverter.
Figure 8:
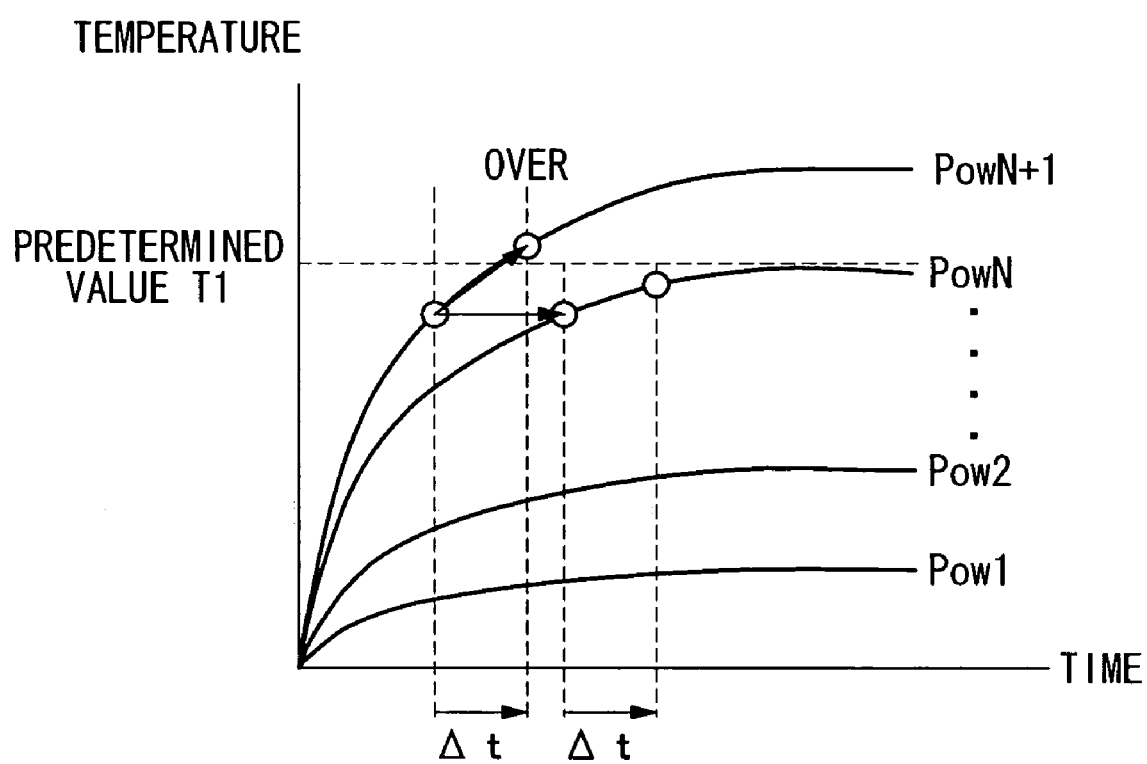
FIG. 8 is a graph showing relationships between the temperature and the time in accordance with the generation power of the generator.

FIG. 5 is a flowchart showing the operation of computing the engine output based on the evaluated temperature of the front motor 32 or the inverter (PDU) 62. In the first step S70, the output of the front motor 32 (i.e., generator) is computed. In the next step S72, the temperature after the predetermined time $\Delta t$ has elapsed is evaluated. This process will be explained by referring to FIG. 8, which is a graph showing relationships between the temperature and the time in accordance with the generation power of the generator. In FIG. 8, generation power Pow1<generation power Pow2< . . . <generation power PowN<generation power PowN+1. As shown in the graph, the increase rate of the temperature with respect to the time increases in accordance with increase in the generation power of the generator 32.

Based on the map, in step S72, a temperature value after the predetermined time $\Delta t$ has elapsed is evaluated, and in the next step S74, it is determined whether the evaluated temperature value is higher than a predetermined value T1. If the result of the determination is YES, the operation proceeds to step S76, while if the result of the determination is NO, the operation of this flowchart is terminated.

In step S76, a process of reducing the output of the front motor 32 is performed. In step S78, a process of reducing the output of the rear motor, which is driven by electric power supplied from the front motor 32, is also performed. In step S80, a process of adding the decrement in the outputs (corresponding to the efficiencies) of the motors 32 and 63 to the output of the engine is performed, and the operation of the flowchart is then terminated. Accordingly, it is possible to secure required motor outputs while securing reliability of the motors, without changing the entire driving force, thereby performing four-wheel drive in a long period of time and also performing control within a specific temperature range.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, the above embodiment employs a continuously variable transmission (CVT); however, this is not a limiting condition and a step transmission may be employed. In addition, the position of the engine is not limited to the front side, and the engine may be positioned at the rear side. Accordingly, the invention is not to be considered as being limited by the foregoing description, and is only limited by the scope of the appended claims.

What is claimed is:

1. A driving force switching control apparatus provided in a four-wheel drive vehicle which has at least one power source and which runs by two-wheel drive or four-wheel drive in accordance with a running state of the vehicle, the apparatus comprising:
    a constant speed running determining device for determining whether the vehicle runs at a constant speed;
    a road surface condition computing device for computing a road surface condition by using rolling resistance when the vehicle runs; and
    a drive system determining device for determining a drive system of the vehicle when it is determined by the constant speed running determining device that the vehicle runs at a constant speed, wherein the drive system is determined to be one of the two-wheel drive and the four-wheel drive in accordance with a computed result of the road surface condition computing device, wherein:
    the drive system determining device changes a threshold value for switching between the two-wheel drive and the four-wheel drive in a manner such that a determination area where the four-wheel drive is selected increases according to increase in the rolling resistance.

2. A driving force switching control apparatus as claimed in claim 1, wherein the four-wheel drive vehicle is a hybrid vehicle in which either one of front wheels and rear wheels is driven by an internal-combustion engine and the other one is driven by a motor.

3. A driving force switching control apparatus as claimed in claim 2, wherein:
    the vehicle comprises a first motor which is the motor which drives the other one of the front wheels and the rear wheels, a second motor for generating specific power by a driving output of the internal-combustion engine, a battery device charged by electric power generation by the second motor, and an inverter provided between the second motor and the battery device;
    the drive system determining device includes a temperature evaluating device for evaluating, based on a temperature and a quantity of electric power generation of the second motor or the inverter, a temperature of the second motor or the inverter at the quantity of electric power generation after a predetermined time has elapsed; and
    the drive system determining device reduces the quantity of electric power generation if it is estimated according to the evaluation of the temperature evaluating device that the temperature of the second motor or the inverter reaches a predetermined value after the predetermined time has elapsed.

4. A driving force switching control apparatus as claimed in claim 2, wherein:
    the vehicle comprises a first motor which is the motor which drives the other one of the front wheels and the rear wheels, a second motor for generating specific power by a driving output of the internal-combustion engine, and a battery device for storing electric power generated by the second motor,
    the drive system determining device includes a remaining charge measuring device for measuring a remaining charge of the battery device; and
    a driving output of the internal-combustion engine is computed based on a driving output of main driving wheels of the vehicle, a driving output of the second motor for generating a driving power of the first motor which drives trailing wheels of the vehicle, and the remaining charge of the battery device.

5. A driving force switching control apparatus as claimed in claim 4, wherein:
    a quantity of electric power generation of the battery device is determined in consideration of brake specific fuel consumption;
    when the remaining charge of the battery device is equal to or less than a first predetermined value and a required charge power of the battery device is higher than the quantity of electric power generation in consideration of the brake specific fuel consumption, a required charge power generating output corresponding to the required charge power is added to the driving output of the internal-combustion engine; and
    when the remaining charge of the battery device is equal to or less than the first predetermined value and a required charge power of the battery device is equal to or less than the quantity of electric power generation in consideration of the brake specific fuel consumption, an output for generating a quantity of power corresponding to the quantity of electric power generation in consideration of the brake specific fuel consumption is added to the driving output of the internal-combustion engine.

6. A driving force switching control apparatus as claimed in claim 5, wherein:
    when the remaining charge of the battery device is equal to or greater than a second predetermined value which is greater than the first predetermined value and the quantity of electric power generation in consideration of the brake specific fuel consumption is higher than a maximum charge permitted power of the battery device, a generation output corresponding to the maximum charge permitted power of the battery device is added to the driving output of the internal-combustion engine; and
    when the remaining charge of the battery device is equal to or greater than the second predetermined value and the quantity of electric power generation in consideration of the brake specific fuel consumption is equal to or less than the maximum charge permitted power of the battery device, or when the remaining charge of the battery device is less than the second predetermined value, an output for generating the quantity of electric power generation in consideration of the brake specific fuel consumption is added to the driving output of the internal-combustion engine.

* * * * *